United States Patent Office 2,789,174
Patented Apr. 16, 1957

2,789,174
LIQUID FLOW INDICATOR

John V. Oliveau, Corrigan Lane, Conn., Manning H. Dandridge, New Rochelle, N. Y., William A. Quigley, Greenwich, Conn., and Harris J. Shapiro, East White Plains, N. Y., assignors to The Aerotec Corporation, Greenwich, Conn., a corporation of Connecticut Application February 1, 1954, Serial No. 407,512

6 Claims. (Cl. 200—81.9)

Our invention relates to a device to indicate when a liquid, such as a liquid fuel, is flowing or has ceased to flow.

A particular application of the invention is to indicate when fuel is flowing from a wing fuel tank of aircraft or, conversely, when flow of the fluid ceases, which in turn, indicates whether the tank contains fuel or is empty. When installed in the fuel line from the tank, for example, between the tank and a fuel pump, the device of our invention holds open an indicating electric circuit while liquid fuel is flowing from the tank but closes the circuit and actuates a signal, such as a signal light, or sets in motion a mechanism, such as a control mechanism, when the tank becomes empty and the fuel thereupon ceases to flow. When the tank becomes empty the fuel pump will draw air. The device of our invention however is not operated by the flow of air.

In the device of our invention the fuel is caused to flow through a valve which is held in closed position but which is opened by the force of the flowing liquid fuel when this force is sufficient to overbalance the closing force on the valve. When the flow of liquid fuel ceases or falls so low as not to overbalance the valve, as when the tank becomes empty, the valve closes and actuates a signal or sets into operation a mechanism by closing an electric circuit. Air drawn through the fuel line upon failure of the liquid fuel is by-passed so that it cannot open the balanced valve. This by-pass is operated by a float mechanism which closes the by-pass when the valve chamber is filled with liquid fuel but which permits the by-pass to open when the control mechanism is not filled with liquid fuel.

Figure 1:
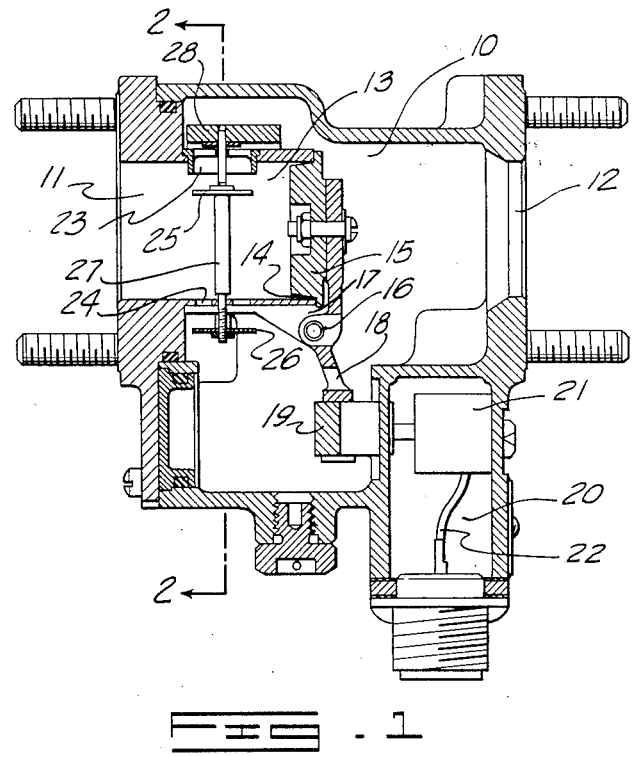
Figure 2:
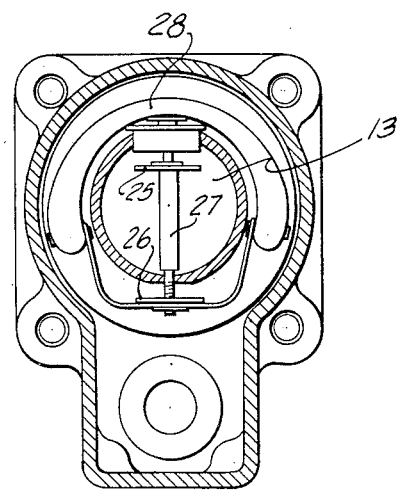

The various features of the invention are illustrated by way of example in the accompanying drawings, in which:

Fig. 1 is a longitudinal vertical section of a control mechanism embodying a preferred form of our invention, Fig. 2 is a vertical cross section of the control mechanism taken on line 2—2 of Fig. 1.

Referring to the accompanying drawings, the control mechanism comprises a valve chamber 10 having an inlet 11 and an outlet 12. Fluid entering the inlet 11 passes into an inlet compartment 13, preferably of cylindrical shape and extending horizontally into the valve chamber. A valve seat 14 is formed at the outlet end of the compartment 13 against which closes a valve 15 hinged at 16 to an ear 17 depending from the wall of the compartment. The valve 15 is yieldingly held in closed position by suitable means such as a weight or spring which permits the valve to open under the force of a liquid flowing into the compartment 13.

Extending downwardly from the valve 15 is an arm 18 which swings about the pivot 16 with the valve. The arm 18 carries a magnet 19 which, in the closed position of the valve, abuts the wall of a switch compartment 20 sealed from the interior of the valve chamber. In this position the magnet 19 closes a magnetic circuit of a magnetically operated switch 21 to hold open an electric control circuit 22.

When liquid fuel flows through the compartment 13 in sufficient amount to force the valve 15 open the arm 18 swings with it carrying the magnet 19 away from the wall of the switch compartment 20 thus breaking the magnetic circuit and permitting the switch 21 to close the circuit 22. The circuit 22 operates a signal or other mechanism, not shown, to indicate that the liquid fuel is not flowing or to operate other mechanisms.

The compartment 13 is provided with a pair of by-pass openings 23 and 24 in the top and bottom portions, respectively, of its walls which may be closed by upwardly closing valves 25 and 26, respectively, carried on a common supporting rod 27, which in turn is supported from a float 28 of saddle form above the compartment 13. When the valve chamber is filled with liquid the float 28 is lifted raising the rod 27 and the valves 25 and 26 until they close the by-pass openings 23 and 24, thus forcing the liquid to flow through the valve seat 14 and open the valve 15. When the flow of liquid ceases, the valve chamber empties sufficiently to permit the float 28 to fall and open the by-pass openings 23 and 24. Air drawn into the compartment 13 escapes through these by-pass openings so that no pressure is built up sufficient to open the valve 15. Air drawn through the valve chamber therefore does not cause the valve to swing the magnet 19 away from the switch chamber and break the magnetic circuit of the switch 21. Consequently no signal or other mechanism is operated when the liquid flow ceases and only air is drawn through the mechanism.

Having described our invention, what we claim is:

1. A device for indicating the flow of liquid which comprises a valve chamber having an inlet and an outlet and a valve seat between said inlet and said outlet and opening to said outlet, a valve seating on the valve seat and displaceable therefrom by a stream of liquid passing through said valve seat from said inlet to said outlet, a mechanism in position to be operated by the opening of said valve, and a float controlled by-pass about said valve seat from said inlet to said outlet positioned to be closed by liquid in said chamber.

2. The device of claim 1 in which said mechanism operated by the opening of said valve comprises an electric circuit and a magnetically operated switch in said circuit.

3. The device of claim 1 in which said float controlled by-pass comprises a by-pass opening between said inlet and said valve seat, a by-pass valve to close said by-pass opening and a float in said valve chamber connected to said valve to close said valve against said opening when said float is buoyed upwardly.

4. The device of claim 1 in which said valve chamber has an inlet compartment extending horizontally from said inlet and in which said compartment has an upper and a lower by-pass port, a pair of by-pass valves, one for each by-pass port, below and movable upwardly to close said by-pass ports, a float in said valve chamber outside of said inlet compartment and a connection from said float to said by-pass valves to lift said by-pass valves to close said by-pass ports when said float is buoyed upwardly.

5. The device of claim 4 which comprises a rod depending from said float and carrying said by-pass valves.

6. The device of claim 4 in which said float is saddle shaped to rest on said inlet compartment and in which a supporting rod extends downwardly from said float through said by-pass ports and in which said by-pass valves are mounted in spaced positions on said rod.

References Cited in the file of this patent

UNITED STATES PATENTS

| | | |
|---|---|---|
| 1,104,419 | Glynn et al. | July 21, 1914 |
| 1,130,792 | Burton | Mar. 9, 1915 |
| 1,804,557 | Gould et al. | May 12, 1931 |
| 2,162,898 | Rotter | June 20, 1939 |